March 8, 1938.  J. S. HITE  2,110,800

MILK BOTTLE HOLDER

Filed June 2, 1937  2 Sheets-Sheet 1

John S. Hite INVENTOR
BY Victor J. Evans & Co.
ATTORNEYS

March 8, 1938.  J. S. HITE  2,110,800
MILK BOTTLE HOLDER
Filed June 2, 1937  2 Sheets-Sheet 2
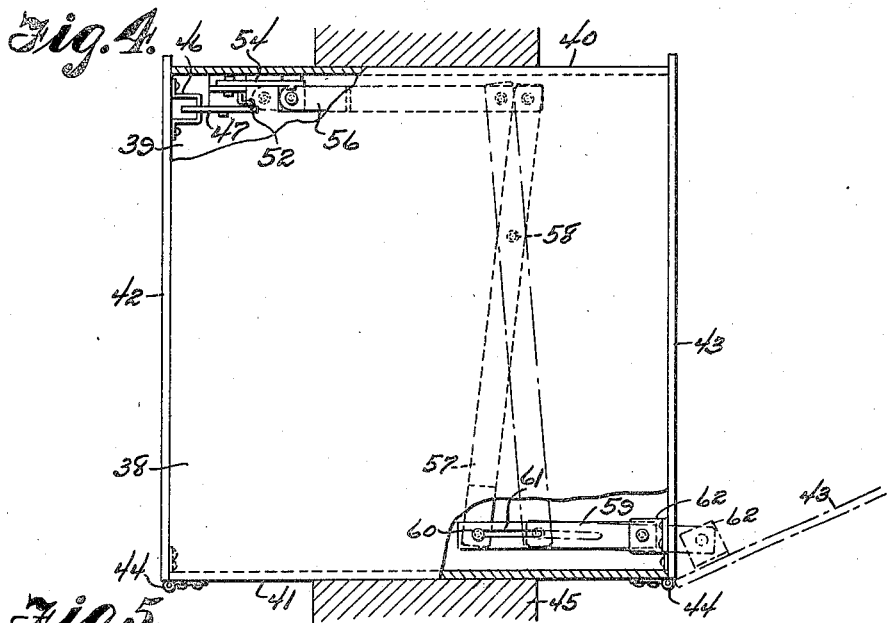
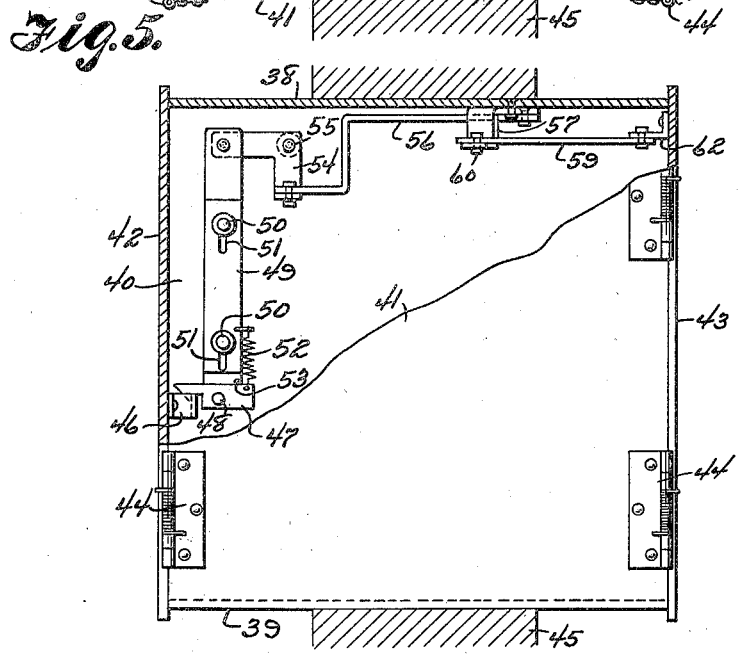
John S. Hite
INVENTOR
BY Victor J. Evans & Co.
ATTORNEYS Patented Mar. 8, 1938

2,110,800

UNITED STATES PATENT OFFICE 2,110,800

MILK BOTTLE HOLDER

John S. Hite, Leesburg, Va.

Application June 2, 1937, Serial No. 146,058

4 Claims. (Cl. 232—41)

This invention relates to milk bottle holders and has for an object to provide a container which may be set into the wall of the kitchen and will be provided with a service door outside of the dwelling and with a retrieve door inside of the dwelling so that a housewife may retrieve milk bottles left by the milkman and place empty bottles in the container to be collected by the milkman.

A further object is to provide novel means for unlatching the service door when the retrieve door is opened so that the service door may be opened by the milkman.

A further object is to provide novel means for holding the service door unlatched after the retrieve door is closed, this means being adapted to be reset to latching position by the milkman after he has placed milk bottles in the container.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 4 is a plan view of a modified form of milk bottle holder with portions broken away to expose some of the working parts.

Figure 5 is a side elevation of the modified form of the invention shown in Figure 4, a portion being broken away to show some of the working parts.

Figure 6 is a detail end elevation of the pivoted operating lever of the latching mechanism.

Figure 1:
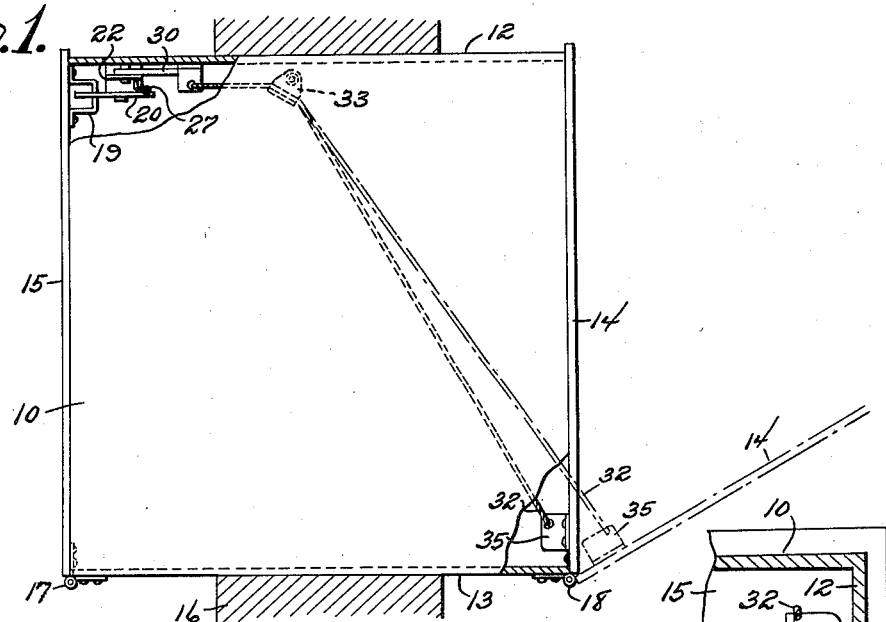
Figure 1 is a top plan view of a milk bottle holder constructed in accordance with the invention, portions being broken away to expose some of the working parts.

Referring now to the drawings in which like characters of reference designate similar parts in the various views, the container is shown to comprise a top wall 10, a bottom 11, side walls 12 and 13, a retrieve door 14 and a service door 15, the doors forming the front and rear walls respectively. The container is adapted to be built into the wall 16 of the dwelling and present the service door outside of the dwelling and the retrieve door inside of the room.

The service door is hinged at one edge to the side wall 13 by spring hinges 17, of conventional type. The retrieve door is hinged to the opposite edge of the side wall 13 by spring hinges 18 of conventional type. Thus both doors have a tendency to normally remain closed.

Figure 3:
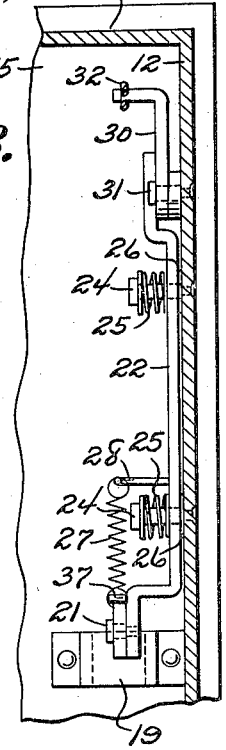
Figure 3 is a cross sectional view taken on the line 3—3 of Figure 1 and showing the operating mechanism in elevation.

The service door latching mechanism comprises a keeper 19 best shown in Figure 1, over which the hook of a latch 20 is engaged to latch the service door closed. The latch is pivoted intermediate its ends as shown at 21 upon an upstanding bar 22 which is provided with longitudinal slots 23 through which pins 24 are passed to slidably mount the bar upon the inner face of the side wall 12 of the container. As best shown in Figure 3, springs 25 are sleeved on the pins and urge the bar against wear plates or spacing washers 26 carried by the pins and bearing upon the side wall 12. The bar is thus spring pressed against the washers so that when raised to unlatched position it will remain in this position unless manually moved as will presently be described.

A helical spring 27 is connected at one end to a pin 28 that projects from the sliding bar 22 and at the opposite end is connected to the rear end of the pivoted latch 20. The function of this spring is to yieldably hold the latch in latching position.

Figure 2:
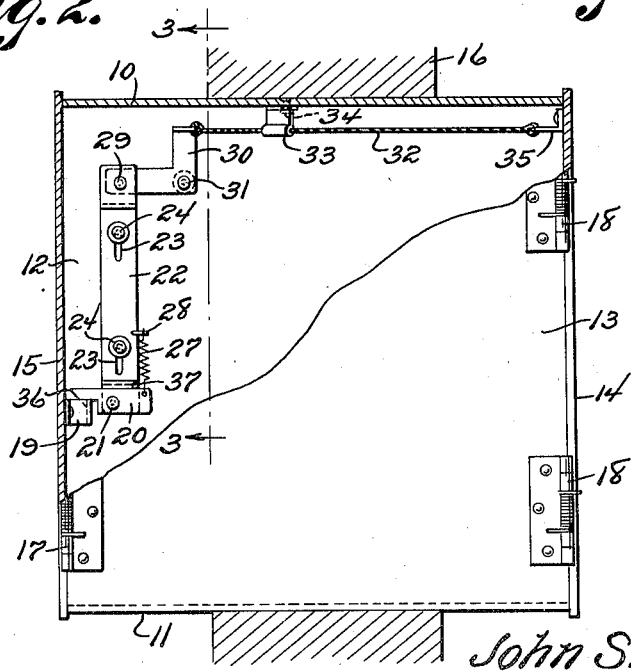
Figure 2 is a side elevation of the milk bottle holder with a portion broken away to expose the working parts.

The upper end of the sliding bar 22 is pivotally connected as shown at 29 to a bell crank lever 30 that is pivotally connected at its elbow as shown at 31 to the side wall 12 of the container. A limp cable 32 is connected to the free end of the bell crank lever and is trained through a guide 33 that is pivoted as shown at 34 on the top 10 of the container. The cable extends along the underneath side of the top 10 and is terminally connected to a bracket 35 that is secured to the retrieve door 14 near the upper hinge of the door, as best shown in Figure 2.

In operation, when the housewife pulls the retrieve door open to set empty milk bottles in the container the cable 32 is pulled and rocks the bell crank 30 to lift the sliding spring pressed bar 22 and disengage the latch 20 from the keeper 19. Due to the pressure of the springs 25 the bar will remain in this raised position when the retrieve door is closed so that the service door is left unlatched to permit the milk man removing the empty bottles and replacing them with filled bottles. Before the milkman leaves he manually pulls down the bar 22 to its lowermost limit of movement on the pins 24. When the milkman closes the door the keeper 19 will ride along the inclined front edge 36 of the latch thereby rocking the latch against the tension of its controlling spring 27 to permit the hook latching over the keeper as soon as it arrives in proper position to do so. The service door is now latched closed so that pilfering of the milk bottles will be positively prevented.

The latch 20 is prevented from moving past a position where it will engage the keeper, by a stop pin 37 disposed on the bar 22 above the rear end of the latch. The latch engages the stop pin under urge of the spring 27 when the bar 22 is moved upwardly and thus is held in a substantially horizontal position ready to ride into the keeper when the milkman pulls the bar 22 downward as previously described.

A modified form of the invention is shown in Figures 4 and 5 in which the container is the same as previously described, and comprises a top 38, a bottom 39, side walls 40 and 41, a service door 42, and a retrieve door 43, the doors forming rear and front walls, and the doors being hinged to the side wall 21 by spring hinges 44. The container is set into the wall 45 of the building in position to present the service door outside of the building and the retrieve door inside of the building.

The service door latching mechanism comprises a keeper 46 into which hooks a latch 47 that is pivoted as shown at 48 upon the bottom of an upstanding bar 49. The bar is slidably mounted upon the side wall 40 by means of pins 50 engaged in slots 51 in the bar. As previously described the bar is frictionally held at its upper limit of movement by springs. A spring 52 carried by the bar is connected to the latch 47 and holds the latch yieldably against a stop pin 53.

The means for operating the bar 49 is different than the preferred form of the invention shown in Figures 1, 2 and 3 in that the bell crank lever 54 is pivoted upon the side wall 40 as shown at 55 and the free leg of the bell crank lever is connected to a link 56 which extends along the side wall underneath the top 38 and is pivotally connected at the rear end to the outer end of a lever 57 which is pivotally connected intermediate its ends to the top 38 as shown at 58. The lever extends toward the side wall 41 and is slidably connected to a link 59 by means of a pin 60 carried by the lever and engaged in a longitudinal slot 61 formed in the link.

The link is terminally connected to a bracket 62 disposed on the retrieve door 43 above the upper hinge, as best shown in Figure 5.

In operation when the retrieve door 43 is opened the link 59 rocks the lever 57 on its pivot 58 which in turn pushes on the link 56 to rock the bell crank lever 59 and lift the bar 49 and latch 47 upwardly to disengage the latch from the keeper 46.

When the service door 42 is closed the pin 60 slides in the slot 61 in the link 59 so that the position of the lever is not disturbed and consequently the latch 47 remains in its raised position until manually reset by the milkman as previously described. When the milkman resets the latch 57 by pulling down upon the bar 49 the lever 57 is rocked on its pivot to move the pin 60 to the end of the slot in the link 59 ready for the next operation.

From the above description it is thought that the construction and operation of the invention will be fully understood without further explanation.

What is claimed is:

1. A device of the class described comprising a container having a hinged service door and a hinged retrieve door, a keeper on the inside of the service door, a latch engageable with the keeper, a spring pressed vertically disposed bar carrying the latch, and means connecting the bar to the retrieve door for releasing the latch from the keeper when the retrieve door is opened, said spring pressed bar remaining in latch releasing position until manually reset after each actuation.

2. A device of the class described comprising a container having a hinged service door and a hinged retrieve door, a keeper on the inside of the service door, a latch engageable with the keeper, a spring pressed vertically disposed bar carrying the latch, a bell crank lever on one wall of the container having one leg connected to the upper end of the bar, and a limp cable connected to the other leg of the bell crank lever and connected to the retrieve door for moving the bar to release the latch when the retrieve door is opened.

3. A device of the class described comprising a container having a hinged service door and a hinged retrieve door, a keeper on the inside of the service door, a latch engageable with the keeper, a vertically disposed bar slidably mounted on one wall of the casing and carrying said latch, means for limiting sliding movement of the bar, springs urging the bar toward one wall of the casing and releasably holding the bar in raised position when the bar is moved to release the latch, and means connecting the bar to the retrieve door and adapted to raise the bar and release the latch when the retrieve door is opened.

4. A device of the class described comprising a container having a hinged service door and a hinged retrieve door, a keeper on the inside of the service door, a latch engageable with the keeper, a spring pressed vertically disposed bar carrying the latch, lever mechanism operatively connected to the upper end of said bar for moving the bar to latch releasing position, said mechanism having a pin, and a link connected to said retrieve door and having a slot receiving said pin, said pin actuating said lever mechanism when engaged at one end of said slot and permitting the lever mechanism to be undisturbed when the pin is engaged at the other end of said slot.

JOHN S. HITE.